(12) United States Patent
Ishiguro et al.

(10) Patent No.: US 11,674,561 B2
(45) Date of Patent: Jun. 13, 2023

(54) FRICTION TRANSMISSION BELT

(71) Applicant: Mitsuboshi Belting Ltd., Kobe (JP)

(72) Inventors: Hisato Ishiguro, Hyogo (JP); Takuya Tomoda, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 290 days.

(21) Appl. No.: 16/092,818

(22) PCT Filed: Apr. 14, 2017

(86) PCT No.: PCT/JP2017/015262
§ 371 (c)(1),
(2) Date: Oct. 11, 2018

(87) PCT Pub. No.: WO2017/179690
PCT Pub. Date: Oct. 19, 2017

(65) Prior Publication Data
US 2019/0128373 A1 May 2, 2019

(30) Foreign Application Priority Data

Apr. 15, 2016 (JP) .............................. JP2016-082465
Apr. 12, 2017 (JP) .............................. JP2017-078980

(51) Int. Cl.
*F16G 5/08* (2006.01)
*F16G 5/20* (2006.01)
(Continued)

(52) U.S. Cl.
CPC ................. *F16G 5/08* (2013.01); *B32B 3/30* (2013.01); *B32B 25/02* (2013.01); *B32B 25/042* (2013.01);
(Continued)

(58) Field of Classification Search
CPC ..... F16G 5/00; F16G 5/04; F16G 5/06; F16G 5/08; F16G 5/20; F16G 1/06; F16G 1/08;
(Continued)

(56) References Cited

U.S. PATENT DOCUMENTS 4,758,213 A * 7/1988 Tanaka ...................... F16G 1/08
474/264
5,663,225 A * 9/1997 Ishida .................. C08K 5/3415
524/211
(Continued)

FOREIGN PATENT DOCUMENTS

CN   101395401 A   3/2009
CN   102725343 A   10/2012
(Continued)

OTHER PUBLICATIONS

May 28, 2019—(JP) Notification of Reasons for Refusal—App 2017-078980.
(Continued)

*Primary Examiner* — Michael R Mansen
*Assistant Examiner* — Raveen J Dias
(74) *Attorney, Agent, or Firm* — Banner & Witcoff, Ltd.

(57) ABSTRACT

A frictional power transmission belt is provided, containing an adhesion rubber layer in contact with at least a portion of a tension member extending in a longitudinal direction of the belt, in which the adhesion rubber layer is formed of a first vulcanized rubber composition containing a rubber component and a filler, the filler contains substantially no silica and contains 30 parts by mass or more of carbon black based on 100 parts by mass of the rubber component, and the tension member has, on a surface thereof, an overcoat layer formed of a second vulcanized rubber composition containing a rubber component and silica.

3 Claims, 2 Drawing Sheets

(51) Int. Cl.
| | |
|---|---|
| *F16G 5/06* | (2006.01) |
| *F16G 5/04* | (2006.01) |
| *B32B 3/30* | (2006.01) |
| *B32B 25/04* | (2006.01) |
| *C09J 7/24* | (2018.01) |
| *C09J 7/30* | (2018.01) |
| *B32B 25/02* | (2006.01) |
| *B32B 25/10* | (2006.01) |
| *B32B 25/16* | (2006.01) |
| *C09J 11/04* | (2006.01) |
| *B32B 5/02* | (2006.01) |

(52) U.S. Cl.
CPC ............. *B32B 25/10* (2013.01); *B32B 25/16* (2013.01); *C09J 7/24* (2018.01); *C09J 7/30* (2018.01); *C09J 11/04* (2013.01); *F16G 5/04* (2013.01); *F16G 5/06* (2013.01); *F16G 5/20* (2013.01); *B32B 5/02* (2013.01); *B32B 2260/021* (2013.01); *B32B 2260/048* (2013.01); *B32B 2262/0261* (2013.01); *B32B 2262/0276* (2013.01); *B32B 2264/102* (2013.01); *B32B 2264/108* (2013.01); *B32B 2307/584* (2013.01); *B32B 2307/746* (2013.01); *B32B 2433/04* (2013.01); *C09J 2411/00* (2013.01); *C09J 2411/006* (2013.01)

(58) Field of Classification Search
CPC ..... F16G 1/10; F16G 1/12; F16G 5/10; F16H 9/04; F16H 9/24; B29D 29/106; B32B 3/263; B32B 25/02; B32B 25/10; B32B 3/30; B32B 25/16; B32B 25/042; B32B 2260/021; B32B 2260/048; B32B 2262/0261; B32B 2262/0276; B32B 2264/102; B32B 2264/108; B32B 2307/584; B32B 2307/746; B32B 2433/04
See application file for complete search history.

(56) References Cited

U.S. PATENT DOCUMENTS

| | | | | |
|---|---|---|---|---|
| 5,860,883 A * | 1/1999 | Jonen | ............ | F16G 5/20 474/205 |
| 6,361,462 B1 * | 3/2002 | Takada | ............ | B32B 25/02 474/237 |
| 6,491,598 B1 * | 12/2002 | Rosenboom | ............ | B32B 25/14 474/260 |
| 9,115,784 B2 | 8/2015 | Nakashima et al. | | |
| 9,777,796 B2 | 10/2017 | Hineno et al. | | |
| 10,001,193 B2 | 6/2018 | Ishiguro et al. | | |
| 2006/0105873 A1 * | 5/2006 | Sato | ............ | F16G 5/20 474/263 |
| 2009/0011884 A1 * | 1/2009 | Nakashima | ............ | F16G 5/20 474/205 |
| 2009/0081473 A1 * | 3/2009 | Ohno | ............ | B29D 29/08 428/515 |
| 2011/0263367 A1 * | 10/2011 | Baldovino | ............ | F16G 1/28 474/204 |
| 2013/0040771 A1 * | 2/2013 | Well | ............ | F16G 1/28 474/205 |
| 2014/0093729 A1 * | 4/2014 | Furusawa | ............ | C08K 7/02 428/367 |
| 2014/0287862 A1 * | 9/2014 | Yamada | ............ | F16G 1/28 474/204 |
| 2014/0323256 A1 * | 10/2014 | Yoshida | ............ | B29D 29/10 474/148 |
| 2014/0364260 A1 * | 12/2014 | Takahashi | ............ | C08L 23/16 474/263 |
| 2014/0378256 A1 * | 12/2014 | Tamura | ............ | F16G 5/08 474/265 |
| 2015/0024892 A1 | 1/2015 | Hineno et al. | | |
| 2015/0105198 A1 * | 4/2015 | Yamaji | ............ | F16G 1/10 474/265 |
| 2015/0111677 A1 * | 4/2015 | Nishiyama | ............ | C08K 5/20 474/264 |
| 2015/0148165 A1 * | 5/2015 | Matsuda | ............ | F16G 5/08 474/264 |
| 2015/0219185 A1 * | 8/2015 | Matsuda | ............ | C08K 5/098 474/238 |
| 2016/0208888 A1 | 7/2016 | Nonaka et al. | | |
| 2016/0298725 A1 | 10/2016 | Ishiguro et al. | | |
| 2016/0298727 A1 | 10/2016 | Matsumoto et al. | | |
| 2017/0023098 A1 * | 1/2017 | Burlett | ............ | F16G 5/20 |
| 2018/0045273 A1 * | 2/2018 | Kobayashi | ............ | F16G 1/28 |
| 2018/0223953 A1 * | 8/2018 | Harada | ............ | B29D 29/10 |
| 2018/0326680 A1 * | 11/2018 | Okubo | ............ | F16G 1/12 |
| 2019/0003555 A1 * | 1/2019 | Ishiguro | ............ | C08K 3/04 |
| 2019/0011016 A1 * | 1/2019 | Yoshida | ............ | C08L 23/08 |
| 2019/0055381 A1 * | 2/2019 | Takano | ............ | C08K 3/04 |
| 2019/0128372 A1 * | 5/2019 | Ishiguro | ............ | B32B 25/02 |
| 2019/0390047 A1 * | 12/2019 | Ozaki | ............ | C08K 5/098 |

FOREIGN PATENT DOCUMENTS

| | | | | |
|---|---|---|---|---|
| CN | 104160174 A | 11/2014 | | |
| CN | 105392940 A | 3/2016 | | |
| EP | 2843258 A1 * | 3/2015 | ............ | F16G 1/28 |
| EP | 2980445 A1 | 2/2016 | | |
| JP | S61-290255 A | 12/1986 | | |
| JP | H10-238596 A | 9/1998 | | |
| JP | 2001108021 A | 4/2001 | | |
| JP | 2003194152 A | 7/2003 | | |
| JP | 2003240055 A | 8/2003 | | |
| JP | 2006-124484 A | 5/2006 | | |
| JP | 2008-261473 A | 10/2008 | | |
| JP | 2008-261489 A | 10/2008 | | |
| JP | 2009-156467 A | 7/2009 | | |
| JP | 2012-045895 A | 3/2012 | | |
| JP | 2012-177068 A | 9/2012 | | |
| WO | 2015-045256 A1 | 4/2015 | | |

OTHER PUBLICATIONS

Oct. 30, 2018—(JP) Notification of Reasons for Refusal—App 2017-078980.
Jul. 18, 2017—International Search Report—Intl App PCT/JP2017/015262.
Mar. 6, 2020—(ID) Office Action—App P00201807569.
Aug. 21, 2019—(CN) Notification of First Office Action—App 201780022624.5.
Oct. 29, 2019—(EP) Extended Search Report—App 17782503.1.
Feb. 6, 2023—(TH) Office Action—App 1801006310.

* cited by examiner

[FIG. 1]
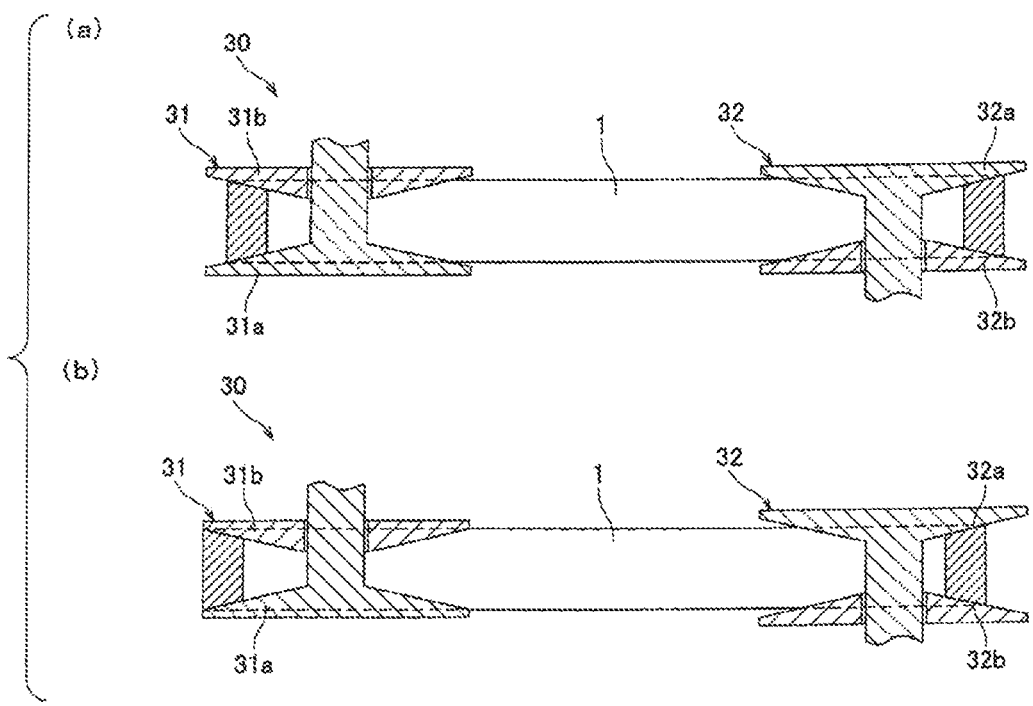
[FIG. 2]
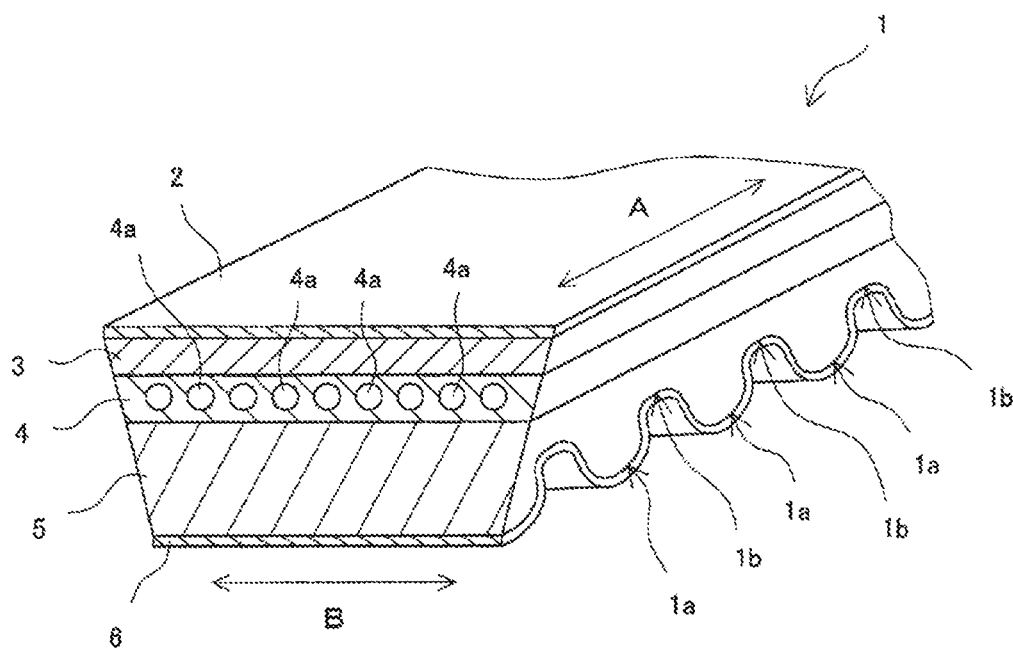

[FIG. 3]
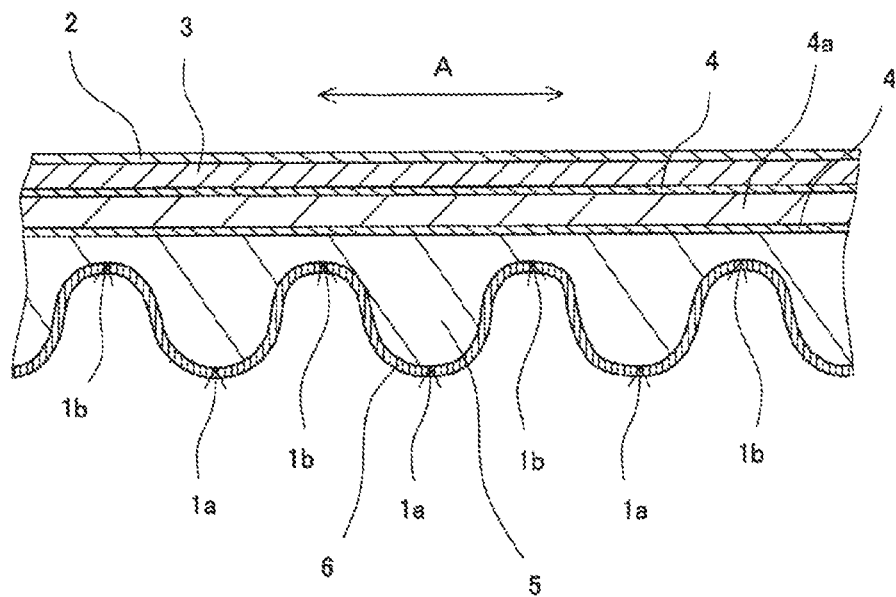
[FIG. 4]
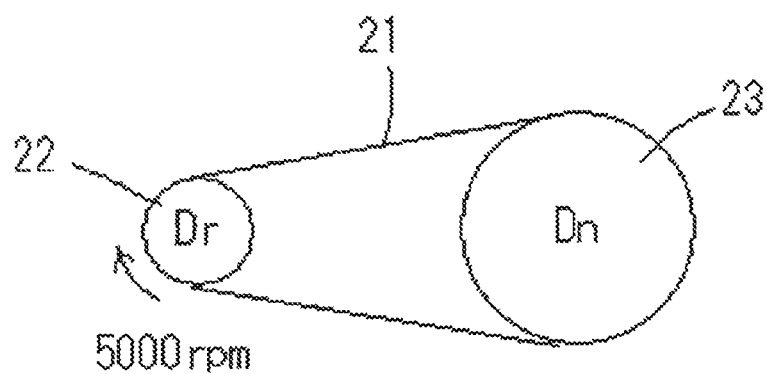

FRICTION TRANSMISSION BELT

CROSS REFERENCE TO RELATED APPLICATIONS

This is a U.S. National Phase Application under 35 U.S.C. § 371 of International Application No. PCT/JP2017/015262, filed Apr. 14, 2017, which claims priority to Japanese Application Nos. 2016-082465 filed Apr. 15, 2016 and 2017-078980 filed Apr. 12, 2017, which was published Under PCT Article 21(2), the entire contents of which are incorporated herein by reference.

TECHNICAL FIELD

The present invention relates to a frictional power transmission belt in which a frictional power transmission surface is formed to be inclined in a V shape, such as a V-belt and a V-ribbed belt, and in more detail, it relates to a frictional power transmission belt that is excellent in mechanical characteristics such as interfacial peeling resistance, abrasion resistance and low friction coefficient.

BACKGROUND ART

Conventionally, a frictional power transmission belt such as a V-belt, a V-ribbed belt and a flat belt has been known as a power transmission belt that transmits power. The V-belt or V-ribbed belt in which a frictional power transmission surface (V-shaped side surface) is formed of a V-angle is wound with tension applied between a drive pulley and a driven pulley, and rotates between two axes in a state where the V-shaped side surface is in contact with V-grooves of the pulleys. In the process, power is transmitted by utilizing an energy accompanying a friction generated by a thrust between the V-shaped side surface and the V-groove of the pulley. In these frictional power transmission belts, a tension member is buried in a rubber body (between compression rubber layer and tension rubber layer) along a longitudinal direction of the belt, and this tension member plays a role that transmits power from the drive pulley to the driven pulley. In addition, an adhesion rubber layer is usually provided in order to enhance adhesiveness between the cord and rubber.

The V-belt includes a raw-edge type (raw-edge V-belt) that has the frictional power transmission surface (V-shaped side surface) being an exposed rubber layer, and a wrapped type (wrapped V-belt) that has the frictional power transmission surface (V-shaped side surface) covered with a cover fabric, which are used separately depending on an application from a difference in surface properties of the frictional power transmission surface (friction coefficients of rubber layer and cover fabric). In addition, the raw-edge type belt includes a raw-edge cogged V-belt in which flexibility is improved by providing cogs only on a lower surface (inner peripheral surface) of the belt or on both the lower surface (inner peripheral surface) and an upper surface (outer peripheral surface) of the belt.

The raw-edge V-belt or raw-edge cogged V-belt is mainly used for driving of a general industrial machinery and agricultural machinery, accessory driving in automobile engines, and the like. In addition, there is a raw-edge cogged V-belt called a variable speed belt used for a belt-type continuously variable transmission of a motorcycle or the like, as another application.

As illustrated in FIG. 1, a belt-type continuously variable transmission 30 is a device that steplessly changes a gear ratio by winding a frictional power transmission belt 1 around a drive pulley 31 and a driven pulley 32. The pulleys 31 and 32 include fixed pulley pieces 31a and 32a fixed in the axial direction and movable pulley pieces 31b and 32b movable in the axial direction, respectively, and have a structure that can continuously change the width of the V-groove of the pulleys 31 and 32 formed of these fixed pulley pieces 31a and 32a and movable pulley pieces 31b and 32b. The power transmission belt 1 has both end surfaces in the width direction being formed as tapered surfaces of which inclines match with facing surfaces of the V-grooves of each pulley 31 and 32, and fits into any positions in the vertical direction on the facing surface of the V-grooves according to the width of the V-grooves changed. For example, when a state illustrated in (a) of FIG. 1 is changed to a state illustrated in (b) of FIG. 1 by reducing the width of the V-groove of the drive pulley 31 and increasing the width of the V-groove of the driven pulley 32, the power transmission belt 1 moves upward the V-groove on the drive pulley 31 side and downward the V-groove on the driven pulley 32 side, and a winding radius to the pulleys 31 and 32 continuously changes, whereby the gear ratio can be steplessly changed. The variable speed belt used for such an application is used with a harsh layout at a high load as well as the belt is significantly bent. That is, specific design has been made to withstand not only a winding rotation between two axes of the drive pulley and the driven pulley but also harsh movements in high-load conditions such as a movement in the radial direction of the pulley, and a repeated bending motion due to a continuous change of the winding radius.

Therefore, one of important factors responsible for durability of the frictional power transmission belt such as a variable speed belt is the resistance to lateral pressure received from the pulley. Conventionally, as a formulation to improve the lateral pressure resistance, a rubber composition reinforced by compounding short fibers or the like to have a large mechanical characteristic is used for the compression rubber layer and the tension rubber layer. On the other hand, if the mechanical characteristic of the adhesion rubber layer is excessively increased, a bending fatigue resistance decreases. Therefore, a rubber composition having a relatively low mechanical characteristic has been used as an adhesion rubber layer.

For example, PTL 1 discloses a power transmission V-belt in which a rubber hardness of at least one of the tension rubber layer and compression rubber layer is set to be within a range of from 90 to 96°, a rubber hardness of the adhesion rubber layer is set to from 83 to 89°, and aramid short fibers are oriented in the width direction of the belt in the tension rubber layer and compression rubber layer. In this literature, occurrence of cracks or separations (peelings) of each rubber layer and cord at an early stage are prevented and a lateral pressure resistance is improved, so that high-load power transmission capability is improved. Furthermore, as the adhesion rubber layer, a rubber composition containing 100 parts by mass of chloroprene rubber, from 40 to 60 parts by mass of a reinforcing filler (carbon black) and from 5 to 30 parts by mass of silica is discloses, and it is discloses that in the case where the amount of silica blended is less than 5 parts by mass, the effect of enhancing adhesive force hardly occurs. Details of the adhesion rubber layer in Examples are unknown.

However, from a viewpoint of compounding design of such a rubber composition, the following problems (1) to (4)

which are caused by running of the belt in a high-load environment and may pose a decrease in durability (lifetime) are concerned.

(1) Low adhesiveness between a cord and an adhesion rubber layer leads to peeling between the cord and the adhesion rubber layer.

(2) A high friction coefficient of a contact surface (power transmission surface) of the belt with respect to a pulley easily leads to a deformation of the belt (in particular, buckling called dishing) since the belt does not smoothly move.

(3) As the belt moves in the radial direction of the pulley or deforms (buckles), a shear stress occurs inside the belt. In particular, the shear stress is likely to concentrate on the interfaces having a difference in mechanical characteristics (in this case, interface between compression rubber layer or tension rubber layer and adhesion rubber layer), which leads to an interfacial peeling (cracks).

(4) The contact surface (power transmission surface) of the belt with respect to a pulley is abraded due to sliding with the pulley.

That is, in order to attain a high durability (long lifetime) so as to withstand the harsh movement of the belt in high-load conditions, a specific design that satisfies not only the lateral pressure resistance but also all these properties is required. In particular, for the adhesion rubber layer, compounding formulations for solving problems such as adhesiveness between the cord and the adhesion rubber layer and interface peeling due to concentration of the shear stress have been studied.

Regarding the adhesiveness between the cord and the adhesion rubber layer, there is a related art technique of blending silica having high adhesiveness as a reinforcing material. For example, PTL 2 discloses a power transmission belt formed of an organic peroxide-crosslinked material of a rubber composition containing from 20 to 70 parts by mass of silica and from 1 to 10 parts by mass of carbon black based on 100 parts by mass of a rubber component containing an ethylene-α-olefin elastomer.

Furthermore, PTL 3 discloses: a first rubber composition containing from 1 to 100 parts by mass of silica, from 0.01 to 15 parts by mass of a silane coupling agent and from 0.1 to 30 parts by mass of a filler such as carbon black based on 100 parts by mass of an ethylene-α-olefin-diene copolymer, as a rubber composition for covering a fiber constituting a cord of a power transmission belt; and a second rubber composition containing from 1 to 10 0 parts by mass of silica and from 1 to 10 0 parts by mass of a filler such as carbon black based on 100 parts by mass of an ethylene-α-olefin-diene copolymer, as a rubber composition for covering or burying the fiber covered with the first rubber composition. In Examples of this literature, as the first rubber composition, a composition containing 5 parts by mass of carbon black and 20 parts by mass of hydrous silica based on 100 parts by mass of EPDM was prepared, and as the second rubber composition, a composition containing 35 parts by mass of carbon black and 20 parts by mass of hydrous silica based on 100 parts by mass of EPDM was prepared.

However, with these methods of blending silica as a reinforcing material, although adhesiveness is enhanced, it is disadvantageous in mechanical characteristics such as interfacial peeling resistance, abrasion resistance and low friction coefficient as compared with other reinforcing materials such as carbon black. The reason is that, when silica is mixed in a large amount, processing such as kneading is difficult, which limits the amount of silica and thus, the mechanical characteristics of the adhesion rubber layer cannot be sufficiently improved. That is, it is impossible to improve the mechanical characteristics of the adhesion rubber layer to such a level that the difference in the mechanical characteristics between the compression rubber layer or tension rubber layer and the adhesion rubber layer can be reduced to prevent interfacial peeling. In addition, silica cannot be increased to such an amount that the friction coefficient can be sufficiently lowered. In addition, the rubber composition blended with silica has lower abrasion resistance than the cases of other reinforcing materials. Furthermore, in the case where a large amount of silica is blended, the pulley abrades away during running of the belt, which is remarkable particularly in the case where the pulley is formed of a soft material such as aluminum.

On the other hand, PTL 4 discloses a rubber composition containing from 1 to 20 parts by mass of a metal oxide-vulcanizing agent, from 5 to 30 parts by mass of silica, from 15 to 50 parts by mass of a reinforcing filler, and from 2 to 10 parts by mass of bismaleimide based on 100 parts by mass of chloroprene rubber, as the adhesion rubber layer of a rubber V-belt. In Examples of this literature, an adhesive rubber composition containing 35 parts by mass of carbon black, 25 parts by mass of silica, and from 2 to 8 parts by mass of bismaleimide based on 100 parts by mass of chloroprene rubber was prepared, and it is disclosed that the blending of bismaleimide to the adhesion rubber layer increases the elastic modulus due to an effect of increasing crosslinking density, leads to a decreased compression permanent set, and makes fatigue resistance excellent.

However, even with this adhesion rubber layer, it is not sufficient for the requirement of further high-load conditions in recent years, and in the case where the hardness is excessively increased by increasing the compounding amount of bismaleimide, the bending fatigue resistance decreases.

That is, according to the related art, although means for solving the individual problems have been proposed like the belts in PTLs 1 to 4, but it cannot be said that all of the properties required to withstand harsh movements in the high-load conditions such as a variable speed belt can be satisfied. Specifically, according to the related art, it has not been possible to realize a specific product design that can ensure the mechanical characteristics (interfacial peeling resistance (dispersion of shear stress) and abrasion resistance are satisfied) while maintaining the adhesiveness between the adhesion rubber layer and the cord, and further can suppress the abrasion of pulleys.

CITATION LIST

Patent Literature

PTL 1: JP-A-H10-238596
PTL 2: JP-A-2008-261473
PTL 3: JP-A-2012-177068
PTL 4: JP-A-S61-290255

SUMMARY OF INVENTION

Technical Problem

An object of the present invention is to provide a frictional power transmission belt capable of suppressing peeling and cracking between layers or of a tension member and suppressing abrasion of a belt and a pulley even under harsh conditions in high-load conditions such as a variable speed belt.

Another object of the present invention is to provide a frictional power transmission belt capable of improving bending fatigue resistance.

Solution to Problem

As a result of intensive studies to achieve the above object, the present inventors have found that by forming the adhesion rubber layer of a frictional power transmission belt with a vulcanized rubber composition containing a rubber component and predetermined proportions of carbon black and silica and by covering the surface of a tension member with an overcoat layer formed of another vulcanized rubber composition containing a rubber component and silica, even under harsh conditions in the high-load conditions such as a variable speed belt, it was possible to suppress peeling and cracking between layers and the cord, and to suppress abrasion of the belt and pulley, and completed the present invention.

That is, the frictional power transmission belt according to the present invention is a frictional power transmission belt containing an adhesion rubber layer in contact with at least a portion of a tension member extending in a longitudinal direction of the belt, in which the adhesion rubber layer is formed of a first vulcanized rubber composition containing a rubber component and a filler, the filler contains 30 parts by mass or more of carbon black and from 0.1 to 15 parts by mass of silica based on 100 parts by mass of the rubber component, and the tension member has, on a surface thereof, an overcoat layer formed of a second vulcanized rubber composition containing a rubber component and silica. In the first vulcanized rubber composition, the proportion of the carbon black may be from 30 to 60 parts by mass based on 100 parts by mass of the rubber component. The proportion of the silica in the first vulcanized rubber composition may be from 10 to 30 parts by mass based on 100 parts by mass of the carbon black. The proportion of silica in the second vulcanized rubber composition may be 10 parts by mass or more (particularly from 15 to 50 parts by mass) based on 100 parts by mass of the rubber component. The overcoat layer may have an average thickness of from 5 to 30 μm. The rubber component of the first vulcanized rubber composition and/or the second vulcanized rubber composition may be a chloroprene rubber. The tension member may contain a twisted cord containing a polyester fiber and/or a polyamide fiber.

Advantageous Effects of Invention

In the present invention, the adhesion rubber layer of the frictional power transmission belt is formed of a vulcanized rubber composition containing a rubber component and predetermined proportions of carbon black and silica, and a surface of the tension member is covered with an overcoat layer formed of another vulcanized rubber composition containing a rubber component and silica. Therefore, the adhesion rubber layer is specialized for stress dispersion function due to high mechanical characteristics (high elastic modulus), and the overcoat layer of the tension member is specialized for adhesion function. As a result, peeling and cracking between layers or of the tension member can be suppressed and abrasion of the belt and pulley can be suppressed even under harsh conditions in high-load conditions such as variable speed belt. Furthermore, by adjusting the proportion of carbon black in the adhesion rubber layer to 60 parts by mass or less based on 100 parts by mass of the rubber component, bending fatigue resistance can be improved.

BRIEF DESCRIPTION OF DRAWINGS

FIG. 1 is a schematic view for explaining a transmission mechanism of a belt-type continuously variable transmission.

FIG. 2 is a schematic perspective view illustrating an example of a frictional power transmission belt of the present invention.

FIG. 3 is a schematic cross-sectional view of the frictional power transmission belt of FIG. 2 cut in a longitudinal direction of the belt.

FIG. 4 is a schematic view for explaining a durability running test of the frictional power transmission belt in Examples.

DESCRIPTION OF EMBODIMENTS

[Structure of Frictional Power Transmission Belt]

The frictional power transmission belt of the present invention only has to satisfy that the adhesion rubber layer is formed of a first vulcanized rubber composition containing a rubber component and a filler containing carbon black and a relatively small amount of silica, and a surface of the tension member is covered with an overcoat layer formed of a second vulcanized rubber composition containing a rubber component and silica. Normally, the frictional power transmission belt of the present invention contains a tension member extending in a longitudinal direction of the belt, the adhesion rubber layer in which the tension member is buried, a compression rubber layer formed on one surface of the adhesion rubber layer, and an tension rubber layer formed on the other surface of the adhesion rubber layer.

Examples of the frictional power transmission belt of the present invention include V-belts [wrapped V-belt, raw-edge V-belt, and raw-edge cogged V-belt (raw-edge cogged V-belt with cogs formed on the inner peripheral side of the raw-edge V-belt, and raw-edge double cogged V-belt with cogs formed on both the inner peripheral side and the outer peripheral side of the raw-edge V-belt)], V-ribbed belts, flat belts, and the like. Among these frictional power transmission belts, a V-belt or V-ribbed belt in which a frictional power transmission surface is formed to be inclined in a V-shape (at V-angle) is preferable from the viewpoint of receiving a large lateral pressure from a pulley, and a raw-edge cogged V-belt is particularly preferable from the viewpoint of being used for a belt-type continuously variable transmission that requires high achievement both a lateral pressure resistance and fuel saving performance.

FIG. 2 is a schematic perspective view illustrating an example of the frictional power transmission belt (raw-edge cogged V-belt) of the present invention. FIG. 3 is a schematic cross-sectional view of the frictional power transmission belt of FIG. 2 cut in the longitudinal direction of the belt.

In this example, the frictional power transmission belt 1 has a plurality of cog portions 1a formed on the inner circumferential surface of a belt main body at predetermined intervals along the longitudinal direction (direction A in the drawing) of the belt. The cross-sectional shape of the cog portion 1a in the longitudinal direction is substantially semicircular (curved or corrugated), and the cross-sectional shape in the direction orthogonal to the longitudinal direction (width direction or direction B in the drawing) is trapezoidal. That is, each cog portion 1a protrudes in a substantially semicircular shape in the cross section in the A direction (FIG. 3) from a cog bottom portion 1b in the thickness direction of the belt. The frictional power transmission belt 1 has a laminated structure in which a reinforcing fabric 2, a tension rubber layer 3, an adhesion rubber layer 4, a compression rubber layer 5, and a reinforcing fabric 6 are sequentially laminated from the outer peripheral side of the belt toward the inner peripheral side (side where cog portion 1a is formed). The cross-sectional shape in the width direction of the belt is a trapezoidal shape in which the belt width decreases from the outer peripheral side to the inner peripheral side of the belt. Furthermore, a tension member 4a is buried in the adhesion rubber layer 4, and the cog portion 1a is formed on the compression rubber layer 5 by a mold with a cog.

[Adhesion Rubber Layer]

The adhesion rubber layer (adhesive layer) is provided in contact with at least a portion of the tension member for the purpose of adhering the tension member and a rubber material for forming the belt. In the present invention, the adhesion rubber layer is formed of a vulcanized rubber composition containing a rubber component and a filler.

(Rubber Component)

Examples of the rubber component include a known vulcanizable or crosslinkable rubber component and/or elastomer, for example, diene rubbers [e.g., natural rubber, isoprene rubber, butadiene rubber, chloroprene rubber (CR), styrene butadiene rubber (SBR), vinylpyridine-styrene-butadiene copolymer rubber, acrylonitrile butadiene rubber (nitrile rubber); hydrogenated products of the diene rubbers, such as hydrogenated nitrile rubber (including mixed polymer of hydrogenated nitrile rubber and unsaturated carboxylic acid metal salt), etc.], olefin rubbers [e.g., ethylene-α-olefin rubbers (ethylene-α-olefin elastomer), polyoctenylene rubber, ethylene-vinyl acetate copolymer rubber, chlorosulfonated polyethylene rubber, alkylated chlorosulfonated polyethylene rubber, etc.], epichlorohydrin rubbers, acryl rubbers, silicone rubbers, urethane rubbers, fluoro rubbers, and the like. These rubber components can be used alone or in combination of two or more kinds thereof.

Among these rubber components, ethylene-α-olefin elastomers (ethylene-α-olefin-type rubbers such as ethylene-propylene copolymer (EPM) and ethylene-propylene-diene terpolymer (EPDM)) and chloroprene rubber are widely used from the viewpoint that a vulcanizing agent and a vulcanization accelerator are easily diffused. In particular, in the case of being used in a high-load condition like as a variable speed belt, a chloroprene rubber and EPDM are preferable from the viewpoint of excellent balance of mechanical strength, weather resistance, heat resistance, cold resistance, oil resistance, adhesiveness, and the like. Furthermore, chloroprene rubber is particularly preferable from the viewpoint of excellent abrasion resistance in addition to the above properties. Chloroprene rubber may be a sulfur-modified type or a non-sulfur-modified type.

In the case where the rubber component contains chloroprene rubber, the proportion of chloroprene rubber in the rubber component may be approximately 50% by mass or more (particularly from 80 to 100% by mass), and is particularly preferably 100% by mass (chloroprene rubber only).

(Filler)

In the present invention, in order to remarkably improve fatigue fracture resistance and abrasion resistance, carbon black is contained as a filler. The average particle diameter of carbon black is, for example, from 5 to 200 nm, preferably from 10 to 150 nm and more preferably from 15 to 100 nm, and from the viewpoint of high reinforcing effect, carbon black having a small particle diameter may be employed, for example, from 5 to 38 nm, preferably from 10 to 35 nm, and more preferably approximately from 15 to 30 nm. Examples of the carbon black having a small particle diameter include SAF, ISAF-HM, ISAF-LM, HAF-LS, HAF, HAF-HS, and the like. These carbon blacks can be used alone or in combination.

In the present invention, the proportion of the carbon black is 30 parts by mass or more with respect to 100 parts by mass of the rubber component. Compared to silica, carbon black can suppress deterioration of workability even in a large blending amount. Therefore, the mechanical characteristics (elastic modulus) of the adhesion rubber layer can be improved as compared with a conventional adhesion rubber layer in which silica is blended in a large amount, so that the friction coefficient of the adhesion rubber layer can be reduced. Furthermore, the adhesion rubber layer containing a relatively large amount of carbon black has a small difference in mechanical characteristics from the compression rubber layer (or tension rubber layer). Therefore, the interface between the adhesion rubber layer and the compression rubber layer (or tension rubber layer) does not serve as a point where shear stress is concentrated even if the belt is subjected to shear stress due to harsh movement in belt running in the high-load conditions, and interfacial peeling (cracking) is unlikely to occur. Furthermore, since the rubber composition containing carbon black has better abrasion resistance than the case of silica, the abrasion resistance of the adhesion rubber layer can be improved.

In addition, the proportion of the carbon black may be 100 parts by mass or less with respect to the rubber component, from the viewpoint of suppressing a decrease in the bending fatigue resistance. The proportion of carbon black is preferably from 30 to 80 parts by mass (particularly from 30 to 60 parts by mass), particularly preferably from 40 to 60 parts by mass (particularly from 45 to 60 parts by mass), and may be, for example, approximately from 50 to 70 parts by mass (particularly from 55 to 65 parts by mass), based on 100 parts by mass of the rubber component. In the case where the proportion of carbon black is too small, there is a possibility that the elastic modulus is insufficient and the fatigue fracture resistance and abrasion resistance are lowered; and in the case of too large, there is a possibility that the elastic modulus is too high and the bending fatigue resistance is lowered.

In the present invention, a relatively small amount of silica is further contained as a filler from the viewpoint that the adhesiveness of the adhesion rubber layer can be improved without lowering the mechanical characteristics of the adhesion rubber layer. Silica is a fine, bulky and white powder formed of silicic acid and/or silicate, and can chemically bond with a rubber component since a plurality of silanol groups are present on the surface thereof.

Silica includes dry silica, wet silica, surface treated silica, and the like. In addition, silica can be classified also into, for example, a dry type white carbon, a wet type white carbon, a colloidal silica, a precipitated silica, and the like, according to a classification of a preparing method. These silica can be used alone or in combination of two or more kinds thereof. Among these, a wet type white carbon mainly containing hydrous silicic acid is preferable from the viewpoint of many surface silanol groups and strong chemical bonding force with rubber.

The average particle diameter of the silica is, for example, approximately from 1 to 1,000 nm, preferably from 3 to 300 nm, and more preferably approximately from 5 to 100 nm (particularly from 10 to 50 nm). In the case where the particle diameter of the silica is too large, there is a possibility that the mechanical properties of the adhesion rubber layer may be decreased, and in the case of too small, there is a possibility that uniform dispersion may become difficult.

In addition, though it may be either non-porous or porous, the silica has a nitrogen adsorption specific surface area in accordance with the BET method being, for example, from 50 to 400 m²/g, preferably from 70 to 350 m²/g, and more preferably approximately from 100 to 300 m²/g (particularly, from 150 to 250 m²/g). In the case where the specific surface area is too large, there is a possibility that uniform dispersion may become difficult, and in the case where the specific surface area is too small, there is a possibility that the mechanical properties of the adhesion rubber layer may be decreased.

The proportion of silica is small as compared with the proportion blended in a conventional adhesion rubber layer in order to improve adhesiveness. That is, in the present invention, since the overcoat layer of the tension member contains silica, a large amount of silica is not necessary in the adhesion rubber layer. In the present invention, since the overcoat layer contains silica and the adhesion rubber layer contains silica in a small proportion, both of the mechanical characteristics and adhesiveness (e.g., adhesiveness to the tension member) of the adhesion rubber layer, which are contradictory properties, can be achieved, and in particular, the adhesiveness can be highly improved.

The specific proportion of silica is, for example, from 0.1 to 15 parts by mass (e.g., from 0.1 to 10 parts by mass), preferably from 1 to 14 parts by mass, and more preferably approximately from 3 to 13 parts by mass (particularly from 5 to 12 parts by mass) based on 100 parts by mass of the rubber component. In the case where the proportion of silica is too small, there is a possibility that the effect of improving adhesiveness may not be exhibited. In the case where the proportion of silica is too large, there is a possibility that the mechanical characteristics such as interfacial peeling resistance, abrasion resistance, and low friction coefficient may be deteriorated.

Furthermore, the proportion of silica is approximately 40 parts by mass or less, for example, from 5 to 35 parts by mass, preferably from 10 to 30 parts by mass, and more preferably approximately from 15 to 25 parts by mass based on 100 parts by mass of carbon black.

The filler may further contain a conventional filler. Examples of the conventional filler include clay, calcium carbonate, talc, mica, and the like. These conventional fillers can be used alone or in combination of two or more kinds thereof.

The proportion of carbon black may be 50% by mass or more, preferably 60% by mass or more, more preferably 70% by mass or more (particularly 80% by mass or more), and may be 90% by mass or more (particularly 99% by mass or more), based on the entire filler. In the case where the proportion of carbon black is too small, there is a possibility that the mechanical characteristics of the adhesion rubber layer may be decreased.

The proportion (total proportion) of the filler is, for example, from 30 to 100 parts by mass, preferably from 40 to 80 parts by mass, and more preferably approximately from 50 to 70 parts by mass (particularly from 55 to 65 parts by mass), based on 100 parts by mass of the rubber component. In the case where the proportion of the filler is too small, there is a possibility that the abrasion resistance may decrease due to a decrease in the elastic modulus. On the contrary, in the case of too large, there is a possibility that the elastic modulus is too high and heat generation increases, so that cracks may occur in the tension rubber layer and the compression rubber layer at an early stage.

(Additive)

If necessary, the rubber composition for forming the adhesion rubber layer may contain a vulcanizing agent or crosslinking agent (or crosslinking agent-type), a co-crosslinking agent, a vulcanization aid, a vulcanization accelerator, a vulcanization retardant, a metal oxide (e.g., zinc oxide, magnesium oxide, calcium oxide, barium oxide, iron oxide, copper oxide, titanium oxide, aluminum oxide, etc.), a softening agent (oils such as paraffin oil and naphthene oil, etc.), a processing agent or processing aid (a fatty acid such as stearic acid, a fatty acid metal salt such as a metal stearate, a fatty acid amide such as stearic acid amide, wax, paraffin, etc.), an adhesion improver [resorcinol-formaldehyde co-condensate (RF condensate), an amino resin (a condensate of a nitrogen-containing cyclic compound and formaldehyde, such as a melamine resin such as hexamethylol melamine, hexaalkoxymethyl melamines (e.g., hexamethoxymethyl melamine, hexabutoxymethyl melamine, etc.), a urea resin such as methylol urea, and a benzoguanamine resin such as methylol benzoguanamine resin), a cocondensate thereof (resorcinol-melamine-formaldehyde co-condensate, etc.), etc.], short fibers (polyester short fibers, aramid short fibers, etc.), an antioxidant (oxidation inhibitor, heat aging inhibitor, antiflex-cracking agent, ozone deterioration inhibitor, etc.), a colorant, a tackifier, a plasticizer, a lubricant, a coupling agent (a silane coupling agent, etc.), a stabilizer (an ultraviolet absorber, a heat stabilizer, etc.), a flame retardant, an antistatic agent, and the like. The metal oxide may act as a crosslinking agent. In addition, in the adhesion improver, the resorcinol-formaldehyde co-condensate and the amino resin may be an initial condensate (prepolymer) of a nitrogen-containing cyclic compound such as resorcin and/or melamine with formaldehyde.

As the vulcanizing agent or crosslinking agent, conventional components can be used depending on the type of the rubber component, and examples thereof include the above-mentioned metal oxides (magnesium oxide, zinc oxide, etc.), organic peroxides (diacyl peroxide, peroxyester, dialkyl peroxide, etc.), sulfur vulcanizing agents, and the like. Examples of the sulfur vulcanizing agent include powdered sulfur, precipitated sulfur, colloidal sulfur, insoluble sulfur, highly dispersible sulfur, sulfur chloride (sulfur monochloride, sulfur dichloride, etc.), and the like. These crosslinking agents or vulcanizing agents may be used alone or in combination of two or more kinds thereof. In the case where the rubber component is chloroprene rubber, the metal oxide (magnesium oxide, zinc oxide, etc.) may be used as a vulcanizing agent or crosslinking agent. The metal oxide may be used in combination with another vulcanizing agent (sulfur vulcanizing agent, etc.), and the metal oxide and/or sulfur vulcanizing agent may be used alone or in combination with the vulcanization accelerator.

The proportion of the vulcanizing agent can be selected from the range of approximately from 1 to 20 parts by mass based on 100 parts by mass of the rubber component depending on the kinds of the vulcanizing agent and rubber component. For example, the proportion of the organic peroxide as the vulcanizing agent can be selected from the range of from 1 to 8 parts by mass, preferably from 1.5 to 5 parts by mass, and more preferably approximately from 2 to 4.5 parts by mass based on 100 parts by mass of the rubber component. The proportion of the metal oxide can be selected from the range of from 1 to 20 parts by mass, preferably from 3 to 17 parts by mass, and more preferably approximately from 5 to 15 parts by mass (particularly from 7 to 13 parts by mass) based on 100 parts by mass of the rubber component.

Examples of the co-crosslinking agent (crosslinking aid or co-vulcanizing agent co-agent) include known crosslinking aids such as multi-functional (iso)cyanurate [e.g., triallyl isocyanurate (TAIL), triallyl cyanurate (TAC), etc.], polydienes (e.g., 1,2-polybutadiene, etc.), metal salts of unsaturated carboxylic acids [e.g., zinc (meth)acrylate, magnesium (meth)acrylate, etc.], oximes (e.g., quinone dioxime, etc.), guanidines (e.g., diphenylguanidine, etc.), polyfunctional (meth)acrylates [e.g., ethyleneglycol di(meth)acrylate, butanediol di(meth)acrylate, trimethylolpropane tri(meth) acrylate, etc.], bismaleimides (aliphatic bismaleimides such as N,N'-1,2-ethylene dimaleimide, 1,6'-bismaleimide-(2,2, 4-trimethyl) cyclohexane; arene bismaleimides or aromatic bismaleimides, such as N,N'-m-phenylene dimaleimide, 4-methyl-1,3-phenylene dimaleimide, 4,4'-diphenylmethane dimaleimide, 2,2-bis[4-(4-maleimidophenoxy)phenyl] propane, 4,4'-diphenylether dimaleimide, 4,4'-diphenylsulfone dimaleimide, 1,3-bis(3-maleimidophenoxy) benzene, etc.), and the like. These crosslinking aids can be used alone or in combination of two or more kinds thereof. Of these crosslinking aids, bismaleimides (arene bismaleimides or aromatic bismaleimides, such as N,N'-m-phenylene dimaleimide) are preferred. The addition of a bismaleimide increases the degree of crosslinking and prevents adhesion abrasion and the like.

The proportion of the co-crosslinking agent (crosslinking aid) can be selected from the range of approximately from 0.01 to 10 parts by mass based on 100 parts by mass of the rubber component in terms of solid content, and for example, may be from 0.1 to 10 parts by mass (e.g., from 0.3 to 8 parts by mass), and preferably approximately from 0.5 to 6 parts by mass (particularly, from 1 to 5 parts by mass).

Examples of the vulcanization accelerator include thiuram accelerators [e.g., tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), N,N'-dimethyl-N,N'-diphenylthiuram disulfide, etc.], thiazole accelerators [e.g., 2-mercaptobenzothiazole, a zinc salt of 2-mercaptobenzothiazole, 2-mercaptothiazoline, dibenzothiazyl disulfide, 2-(4'-morpholinodithio) benzothiazole, etc.), etc.], sulfenamide accelerators [e.g., N-cyclohexyl-2-benzothiazyl sulfenamide (CBS), N,N'-dicyclohexyl-2-benzothiazyl sulfonamide, etc.], guanidines (diphenylguanidine, di-o-tolylguanidine, etc.), urea or thiourea accelerators (e.g., ethylene thiourea, etc.), dithiocarbamic acid salts, xanthogenates, and the like. These vulcanization accelerators can be used alone or in combination of two or more kinds thereof. Of these vulcanization accelerators, TMTD, DPTT, CBS and the like are widely used.

The proportion of the vulcanization accelerator may be, for example, from 0.1 to 15 parts by mass, preferably from 0.3 to 10 parts by mass, and more preferably approximately from 0.5 to 5 parts by mass, based on 100 parts by mass of the rubber component in terms of solid content.

The proportion of the softening agent (oils such as naphthene oil) may be, for example, from 1 to 30 parts by mass, and preferably approximately from 3 to 20 parts by mass (e.g., from 5 to 10 parts by mass) based on total 100 parts by mass of the rubber component. In addition, the proportion of the processing agent or processing aid (e.g., stearic acid, etc.) may be 10 parts by mass or less (e.g., from 0 to 10 parts by mass), preferably from 0.1 to 5 parts by mass, and more preferably approximately from 0.3 to 3 parts by mass (particularly from 0.5 to 2 parts by mass) based on 100 parts by mass of the rubber component.

The proportion of the adhesion improver (resorcinol-formaldehyde co-condensate, hexamethoxymethyl melamine, etc.) may be from 0.1 to 20 parts by mass, preferably from 0.3 to 10 parts by mass, and more preferably approximately from 0.5 to 5 parts by mass (from 1 to 3 parts by mass) based on 100 parts by mass of the rubber component.

The proportion of the antioxidant may be, for example, from 0.5 to 15 parts by mass, preferably from 1 to 10 parts by mass, and more preferably approximately from 2.5 to 7.5 parts by mass (particularly from 3 to 7 parts by mass) based on 100 parts by mass of the rubber component.

(Properties of Adhesion Rubber Layer)

The mechanical characteristic of the adhesion rubber layer can be appropriately selected according to the required performance. For example, in accordance with JIS K6253 (2012), the rubber hardness may be, for example, from 75 to 90°, preferably from 80 to 88°, and more preferably approximately from 82 to 86°. The adhesion rubber layer having a high rubber hardness may be formed. For example, by blending a large amount of the filler, the rubber hardness may be adjusted to approximately from 84 to 90°.

The average thickness of the adhesion rubber layer can be appropriately selected according to the type of the belt, and may be, for example, from 0.4 to 3 mm, preferably from 0.6 to 2.2 mm, and more preferably approximately from 0.8 to 1.4 mm.

[Tension Member]

In the present invention, the surface of the tension member is covered with an overcoat layer formed of a vulcanized rubber composition containing a rubber component and silica, from the viewpoint of improving adhesiveness to the adhesion rubber layer.

(Overcoat Layer)

In the present invention, since the overcoat layer laminated on the outermost surface of the tension member contains silica, the adhesiveness between the adhesion rubber layer and the tension member can be improved. As the silica, the silica exemplified as the silica of the adhesion rubber layer can be used. The silica may be used alone or in combination of two or more kinds thereof. The preferred type, average particle diameter and specific surface area of the silica are also the same as those of the silica of the adhesion rubber layer.

The proportion of the silica may be 10 parts by mass or more (e.g., from 10 to 50 parts by mass), for example, from 15 to 50 parts by mass, preferably from 25 to 50 parts by mass, and more preferably approximately from 30 to 45 parts by mass (particularly from 35 to 45 parts by mass) based on 100 parts by mass of the rubber component. In the case where the proportion of the silica is too small, there is a possibility that adhesiveness between the tension member and the adhesion rubber layer may not be sufficiently secured, and in the case of too large, there is a possibility that the workability may be deteriorated and it may become difficult to add to the rubber composition.

As the rubber component, the rubber component exemplified as the rubber component of the adhesion rubber layer can be used. These rubber components can be used alone or in combination of two or more kinds thereof. Among the above-mentioned rubber components, diene rubbers (e.g., chloroprene rubber, nitrile rubber, hydrogenated nitrile rubber, etc.), olefin rubbers (e.g., EPM, EPDM, chlorosulfonated polyethylene rubber, alkylated chlorosulfonated polyethylene rubber, etc.), and the like are widely used. As the rubber component, the same or the same family rubber component (particularly chloroprene rubber) as that in the adhesion rubber layer in which the tension member is buried can be suitably used.

The vulcanized rubber composition forming the overcoat layer may further contain carbon black, if necessary. As the carbon black, the carbon black exemplified as the carbon black of the adhesion rubber layer can be used. The carbon black may be used alone or in combination of two or more kinds thereof. The preferred type and average particle diameter of the carbon black are also the same as those of the carbon black of the adhesion rubber layer.

The proportion of the carbon black may be 50 parts by mass or less, for example, 35 parts by mass or less (e.g., 5 to 35 parts by mass), preferably 30 parts by mass or less (e.g., 20 parts by mass or less), and more preferably 10 parts by mass or less (particularly 5 parts by mass or less) based on 100 parts by mass of the rubber component. In addition, the vulcanized rubber composition may not contain the carbon black. In the case where the proportion of carbon black is too large, there is a possibility that the workability is deteriorated, and it may become difficult to blend silica at a high concentration.

The vulcanized rubber composition forming the overcoat layer may further contain an isocyanate compound and/or an epoxy compound as a curing agent.

Examples of the isocyanate compound include 4,4'-diphenylmethane diisocyanate, tolylene 2,4-diisocyanate, polymethylene polyphenyl diisocyanate, hexamethylene diisocyanate, polyaryl polyisocyanates (e.g., trade name "PAPI") and the like. These isocyanate compounds may be blocked polyisocyanates in which isocyanate groups of polyisocyanate are blocked by reacting blocking agents such as phenols, tertiary alcohols, and secondary alcohols.

Examples of the epoxy compounds include reaction products of a polyhydric alcohol such as ethylene glycol, glycerin and pentaerythritol, or a polyalkylene glycol such as polyethylene glycol, and a halogen-containing epoxy compound such as epichlorohydrin, and reaction products of a polyhydric phenol such as resorcin, bis(4-hydroxyphenyl) dimethylmethane, a phenol-formaldehyde resin and a resorcin-formaldehyde resin, and a halogen-containing epoxy compound.

These curing agents can be used alone or in combination of two or more kinds thereof. Among these, isocyanate compounds are preferred.

The proportion of the curing agent is, for example, from 10 to 200 parts by mass, preferably from 30 to 150 parts by mass, and more preferably approximately from 50 to 100 parts by mass based on 100 parts by mass of the rubber component.

For the vulcanized rubber composition forming the overcoat layer, the filler exemplified as the filler of the adhesion rubber layer (filler other than silica and carbon black) and the additive exemplified as the additive can be used, if necessary. These additives can be used alone or in combination of two or more kinds thereof. The proportion of the additive is the same as that of the adhesion rubber layer. Among these, the filler, vulcanizing agent, co-vulcanizing agent, vulcanization accelerator, adhesion improver, antioxidant, lubricant, and the like are widely used. A representative composition is a combination of a rubber component, silica, RF condensate, and an additive (e.g., vulcanizing agent, co-vulcanizing agent, vulcanization accelerator, adhesion improver, filler, antioxidant, and lubricant).

The average thickness of the overcoat layer is, for example, from 5 to 30 µm, preferably from 8 to 25 µm, and more preferably approximately from 10 to 20 µm. In the present invention, since the overcoat layer is adjusted to such a thin thickness, it can be presumed that the shear stress can be easily dispersed even when the overcoat layer is specialized for the adhesive function, and the deterioration of the mechanical characteristics can be suppressed. In the case where the thickness of the overcoat layer is too thin, there is a possibility that the adhesiveness between the tension member and the adhesion rubber layer may not be sufficiently secured, and in the case of is too thick, there is a possibility that the bending fatigue resistance may be decreased.

(Anchor Coat Layer)

An anchor coat layer may further be interposed between the overcoat layer and the tension member to improve the adhesiveness between the overcoat layer and the tension member.

The anchor coat layer may be formed of a conventional adhesive component and is not particularly limited, and it may be a single layer or a layer in which a plurality of layers are laminated. Among these, from the viewpoint of improving the adhesiveness between the overcoat layer and the tension member, preferred is a combination of a first anchor coat layer that covers the surface of the tension member and a second anchor coat layer that is interposed between the first anchor coat layer and the overcoat layer.

The first anchor coat layer may be a layer formed of the curing agent exemplified in the section of the overcoat layer. As the curing agent, the same or the same family curing agent (particularly isocyanate compound) as the curing agent contained in the overcoat layer can be suitably used.

The average thickness of the first anchor coat layer is, for example, from 0.001 to 5 µm, preferably from 0.01 to 3 µm, and more preferably approximately from 0.05 to 2 µm.

The second anchor coat layer may be formed of a cured product of RFL liquid. The RFL liquid contains resorcin (R), formaldehyde (F), and rubber or latex (L). The resorcin (R) and formaldehyde (F) may be contained in the form of a condensate (RF condensate) thereof. In particular, in the case where the tension member coated with the first anchor coat layer is a twisted cord, the second anchor coat layer forms a film on the first anchor coat layer to improve the convergence of the twisted cord. Furthermore, the second anchor coat layer can firmly adhere to the overcoat layer to firmly integrate the overcoat layer from the first anchor coat layer.

The proportion (proportion of use) of resorcin and formaldehyde can be selected from the range of, for example, the former/latter (molar ratio)=approximately from 1/0.1 to 1/5. In the case where a mixture of a resol and a novolac is prepared, the molar ratio of both may be, for example, the former/the latter=from 1/0.3 to 1/1, preferably from 1/0.4 to 1/0.95, and more preferably approximately from 1/0.5 to 1/0.9. In the case where the proportion of formaldehyde is too large, there is a possibility that contamination due to residual formaldehyde may occur, whereas in the case of too small, the content of the resol RF condensate may be insufficient and the mechanical properties of the cured product may be deteriorated.

The rubber component constituting the latex is not particularly limited as long as flexibility can be imparted to the tension member and, for example, the rubber component exemplified as the rubber component of the adhesion rubber layer can be used. These rubber components can be used alone or in combination of two or more kinds thereof. Among the rubber components, vinyl pyridine-styrene-butadiene copolymer rubber and the like are widely used.

The average thickness of the second anchor coat layer is, for example, from 1 to 30 μm, preferably from 2 to 25 μm, and more preferably approximately from 5 to 20 μm.

(Tension Member)

Although the tension member is not particularly limited as long as it has an overcoat layer containing a rubber component and silica on the surface, usually, cords (twisted cords) disposed at predetermined intervals in the width direction of the belt can be used. The cords are disposed to extend in the longitudinal direction of the belt and are normally disposed to extend in parallel at a predetermined pitch parallel to the longitudinal direction of the belt. The cord only has to satisfy that at least a portion thereof is in contact with the adhesion rubber layer via the overcoat layer, and may be in any form of a form in which the adhesion rubber layer buries the cord, a form in which the cord is buried between the adhesion rubber layer and the tension rubber layer, and a form in which the cord is buried between the adhesion rubber layer and the compression rubber layer. Among these, from the viewpoint of improving the durability, the form in which the adhesion rubber layer buries the cord is preferred.

As the fibers constituting the cord, for example, use can be widely made of synthetic fibers such as polyolefin fibers (polyethylene fibers, polypropylene fibers, etc.), polyamide fibers (polyamide 6 fibers, polyamide 66 fibers, polyamide 46 fibers, aramid fibers, etc.), polyalkylene arylate fibers [poly$C_{2-4}$ alkylene $C_{6-14}$ arylate fibers such as polyethylene terephthalate (PET) fiber and polyethylene naphthalate (PEN) fiber, etc.], vinylon fiber, polyvinyl alcohol fiber, and polyparaphenylene benzobisoxazole (PBO) fiber; natural fibers such as cotton, hemp, and wool; and inorganic fibers such as carbon fibers. These fibers can be used alone or in combination of two or more kinds thereof.

Among the above fibers, from the viewpoint of high modulus, synthetic fibers such as polyester fibers (polyalkylene arylate fibers) having a $C_{2-4}$ alkylene arylate such as ethylene terephthalate and ethylene-2,6-naphthalate as a main constituent unit, and aramid fibers; inorganic fibers such as carbon fibers; and the like are widely used, and polyester fibers (particularly polyethylene terephthalate fiber and polyethylene naphthalate fiber) and polyamide fibers (particularly aramid fiber) are preferred. The fibers may be multifilament yarns. The fineness of the multifilament yarns may be, for example, approximately from 2,000 to 10,000 denier (particularly from 4,000 to 8,000 denier). The multifilament yarns may contain, for example, from 100 to 5,000, preferably from 500 to 4,000, and more preferably approximately from 1,000 to 3,000 monofilament yarns.

As the cord, in general, twisted cords (e.g., organzine twists, single twists, Lang's twists, etc.) using multifilament yarns can be used. The average wire diameter of the cord (fiber diameter of the twisted cord) may be, for example, from 0.5 to 3 mm, preferably from 0.6 to 2 mm, and more preferably approximately from 0.7 to 1.5 mm.

(Method for Manufacturing Tension Member)

The method for manufacturing the tension member is not particularly limited, and the surface of the untreated yarn (cord body) forming the tension member may be covered with the overcoat layer in a conventional method. In the case where the tension member has a first anchor coat layer, a second anchor coat layer and an overcoat layer, the tension member may be manufactured through a first treatment step of treating an untreated yarn of the cord with a first treatment agent for forming the first anchor coat layer, a second treatment step of treating with a second treatment agent for forming the second anchor coat layer, and a third treatment step of treating with a third treatment agent for forming the overcoat layer.

In the first treatment step, the preparation method of the first treatment agent is not particularly limited and usually, a curing agent is dissolved in a solvent such as toluene or methyl ethyl ketone.

The method of treating the untreated yarn with the first treatment agent is not particularly limited, and examples thereof include spraying, coating, immersion, and the like. Among these treatment methods, immersion is widely used. The immersion time may be, for example, from 1 to 20 seconds, and preferably approximately from 2 to 15 seconds.

After the untreated yarn is treated with the first treatment agent, drying may be performed if necessary. The drying temperature may be, for example, from 100 to 250° C., preferably from 110 to 220° C., and more preferably approximately from 120 to 200° C. (particularly from 150 to 190° C.). The drying time may be, for example, from 10 seconds to 30 minutes, preferably from 30 seconds to 10 minutes, and more preferably approximately from 1 to 5 minutes.

In the second treatment step, the second treatment agent normally contains water in many cases. The treatment method with the second treatment agent is the same as the treatment method with the first treatment agent. A preferable drying temperature may be approximately from 150 to 250° C. (particularly from 200 to 240° C.).

In the third treatment step, the method of preparing the third treatment agent is not particularly limited. Normally, an unvulcanized rubber composition is dissolved in a solvent such as toluene or methyl ethyl ketone, and the total solid content concentration is adjusted to, for example, from 1 to 20% by mass, preferably from 2 to 15% by mass, and more preferably from about 3 to 10% by mass. The treatment method with the third treatment agent is also the same as the treatment method with the first treatment agent. A preferable drying temperature may be approximately from 120 to 200° C. (particularly from 150 to 180° C.).

[Compression Rubber Layer and Tension Rubber Layer]

Similar to the vulcanized rubber composition of the adhesion rubber layer, the vulcanized rubber compositions for forming the compression rubber layer (inner rubber layer or inner layer) and the tension rubber layer (outer rubber layer or outer layer) may contain a rubber component (chloroprene rubber, etc.), a vulcanizing agent or crosslinking agent (metal oxide such as magnesium oxide and zinc oxide, sulfur vulcanizing agent such as sulfur, etc.), a co-crosslinking agent or crosslinking aid (a maleimide crosslinking agent such as N,N'-m-phenylene dimaleimide, etc.), a vulcanization accelerator (TMTD, DPTT, CBS, etc.), a filler (carbon black, silica, etc.), a softening agent (oils such as naphthene oil), a processing agent or processing aid (stearic acid, metal stearate, wax, paraffin, etc.), an antioxidant, an adhesion improver, a filler material (clay, calcium carbonate, talc, mica, etc.), a colorant, a tackifier, a plasticizer, a coupling agent (a silane coupling agent, etc.), a stabilizer (an ultraviolet absorber, a heat stabilizer, etc.), a flame retardant, an antistatic agent, and the like.

Furthermore, the vulcanized rubber compositions for forming the compression rubber layer and the tension rubber layer may contain short fibers.

As the short fibers, the fibers exemplified as the fibers constituting the tension member can be used. The short fibers formed of the above-mentioned fibers can be used alone or in combination of two or more kinds thereof. Among these short fibers, preferred is the synthetic fiber or natural fiber, particularly the synthetic fibers (polyamide fibers, polyalkylene arylate fibers, etc.), and among them, short fibers containing at least aramid fiber are particularly preferable from the viewpoint of being rigid, having high strength and modulus and easily protruding on the compression rubber layer surface. The aramid short fiber also has high abrasion resistance. The aramid fiber is commercially available, for example, under the trade names "Conex", "Nomex", "Kevlar", "Technora", "Twaron", and the like.

The average fiber diameter of the short fibers is 2 µm or more, for example, from 2 to 100 µm, preferably from 3 to 50 µm (e.g., from 5 to 50 µm), and more preferably approximately from 7 to 40 µm (particularly from 10 to 30 µm). The average length of the short fibers may be, for example, from 1 to 20 mm (e.g., from 1.2 to 20 mm), preferably from 1.3 to 15 mm (e.g., from 1.5 to 10 mm), and more preferably approximately from 2 to 5 mm (particularly from 2.5 to 4 mm).

In order to suppress compression deformation of the belt against pressing from pulley, the short fibers may be oriented in the width direction of the belt and buried in the adhesion rubber layer.

From the viewpoint of dispersibility and adhesiveness of the short fibers in the rubber composition, the short fibers may be subjected to an adhesion treatment (or surface treatment) in a conventional manner.

Furthermore, the short fibers may protrude from the surface by grinding the surface (frictional power transmission surface). The average protruding height of the short fibers may be approximately 50 µm or more (e.g., from 50 to 200 µm).

In this rubber composition, as the rubber component, rubbers of the same family (diene rubber, etc.) or the same kind (chloroprene rubber, etc.) as the rubber component of the rubber composition of the adhesion rubber layer are used in many cases.

The proportions of the vulcanizing agent or crosslinking agent, the co-crosslinking agent or crosslinking aid, the vulcanization accelerator, the softening agent, the processing agent or processing aid, and the antioxidant can be selected from the same range as those in the rubber composition of the adhesion rubber layer, respectively. In addition, the proportion of short fibers can be selected from the range of approximately from 5 to 50 parts by mass based on 100 parts by mass of the rubber component, and normally, may be from 10 to 40 parts by mass, preferably from 15 to 35 parts by mass, and more preferably approximately from 20 to 30 parts by mass. Furthermore, the proportion of the filler is from 1 to 100 parts by mass, preferably from 3 to 50 parts by mass, and more preferably approximately from 5 to 40 parts by mass based on 100 parts by mass of the rubber component.

The average thickness of the compression rubber layer can be appropriately selected according to the type of the belt, and is, for example, from 2 to 25 mm, preferably from 3 to 16 mm, and more preferably approximately from 4 to 12 mm The thickness of the tension rubber layer can be also appropriately selected according to the type of the belt, and is, for example, from 0.8 to 10.0 mm, preferably from 1.2 to 6.5 mm, and more preferably approximately from 1.6 to 5.2 mm

[Reinforcing Fabric]

The case of using a reinforcing fabric in the frictional power transmission belt is not limited to a form of laminating the reinforcing fabric on the surface of the compression rubber layer, and may be, for example, a form in which a reinforcing fabric is laminated on the surface of the tension rubber layer (surface opposite to the adhesion rubber layer), or a form in which a reinforcing layer is buried in the compression rubber layer and/or the tension rubber layer (e.g., a form described in JP-A-2010-230146). The reinforcing fabric can be formed of, for example, a fabric material (preferably a woven fabric) such as a woven fabric, a wide angle canvas, a knitted fabric, an unwoven fabric. If necessary, the reinforcing fabric may be laminated on the surface of the compression rubber layer and/or the tension rubber layer after adhesion treatment, for example, a treatment with RFL liquid (such as immersion treatment), a friction for rubbing the adhesive rubber into the fabric material, or laminating the adhesive rubber and the fabric material (coating).

[Method for Manufacturing Frictional Power Transmission Belt]

The method of manufacturing the frictional power transmission belt of the present invention is not particularly limited, and a conventional method can be used relating to a laminating step (method of manufacturing a belt sleeve) of each layer.

For example, in the case of a cogged V-belt, a laminated body containing a reinforcing fabric (bottom fabric) and a compression rubber layer sheet (unvulcanized rubber) may be installed on a flat cogged mold having tooth portions and groove portions alternately disposed, with the reinforcing fabric facing downward, and pressed at a temperature of approximately from 60 to 100° C. (particularly from 70 to 80° C.) to prepare a cog pad having a cog portion molded (pad which is not completely vulcanized and is in a semi-vulcanized state), and thereafter both ends of the cog pad may be cut perpendicularly from a top portion of a cog ridge portion. Subsequently, a cylindrical mold may be covered with an inner mother die in which tooth portions and groove portions are alternately disposed, the cog pad may be wound thereon by being engaged with the tooth portions and the groove portions and jointed at the top portion of the cog ridge portion. On the wound cog pad may be laminated a first adhesion rubber layer sheet (lower adhesive rubber: unvulcanized rubber), thereafter, thereon may be spun a tension member into a spiral shape, and further thereon may be sequentially wound a second adhesion rubber layer sheet (upper adhesive rubber: the same as the adhesion rubber layer sheet), a tension rubber layer sheet (unvulcanized rubber), and a reinforcing fabric (top fabric), to thereby prepare a molded body. Thereafter, the mold covered with a jacket may be installed in a vulcanizing can, vulcanization may be conducted at a temperature of approximately from 120 to 200° C. (particularly from 150 to 180° C.) to prepare a belt sleeve, which may be cut into a V-shape by using a cutter or the like.

EXAMPLE

Hereinafter, the present invention will be described in more detail based on Examples, but the present invention is not limited to these Examples. In the following Examples, the raw materials used in Examples, the measurement methods or evaluation methods for each physical property are illustrated below. Unless otherwise specified, "parts" and "%" are on a mass basis.

[Raw Material]

Chloroprene rubber: "R22" manufactured by Tosoh Corporation

Carbon black: "Seast 3" manufactured by Tokai Carbon Co., Ltd.

Silica: "Ultrasil VN-3" manufactured by Evonik Degussa Japan Ltd., specific surface area of from 155 to 195 $m^2/g$ Naphthene oil: "NS-900" manufactured by Idemitsu Kosan Co., Ltd.

Resorcin-formalin copolymer (resorcinol resin): Resorcinol-formalin copolymer having less than 20% of resorcinol and less than 0.1% of formalin Antioxidant: "Nonflex OD3" manufactured by Seiko Chemical Industry Co., Ltd.

Vulcanization accelerator TMTD: tetramethylthiuram disulfide

Aramid short fiber: "Conex Short Fiber" manufactured by Teijin Techno Products Co., Ltd., average fiber length of 3 mm, average fiber diameter of 14 μm, short fibers having adhesion rate of 6% by mass of solid content, which had been subjected to an adhesion treatment with an RFL liquid (2.6 parts of resorcin, 1.4 parts of 37% formalin, 17.2 parts of vinyl pyridine-styrene-butadiene copolymer latex (manufactured by Zeon Corporation), and 78.8 parts of water)

Polymeric MDI: polyisocyanate, "MR-200" manufactured by Tosoh Corporation

VP latex: vinylpyridine-styrene-butadiene copolymer latex, manufactured by Zeon Corporation Cord: twisted cord with a total denier of 6,000 obtained through an organzine twist of 1,000 denier PET fibers in a twist configuration of 2×3 with a primary twist coefficient of 3.0 and a second twist coefficient of 3.0.

[Measurement of Physical Properties of Vulcanized Rubber]

(1) Hardness

An adhesion rubber layer sheet was press-vulcanized at a temperature of 160° C. for 30 minutes to prepare a vulcanized rubber sheet (100 mm×100 mm×2 mm thickness). In accordance with JIS K6253 (2012), the hardness was measured by using a laminate obtained by laminating three sheets of the vulcanized rubber sheets as a sample and by using a durometer type A hardness tester.

(2) Abrasion Amount

A vulcanized rubber sheet (50 mm×50 mm×8 mm thickness) prepared by press-vulcanizing the adhesion rubber layer sheet at a temperature of 160° C. for 30 minutes, was cut out with a hollow drill having an inner diameter of 16.2±0.05 mm to prepare a cylindrical sample having a diameter of 16.2±0.2 mm and a thickness of from 6 to 8 mm In accordance with JIS K6264 (2005), the abrasion amount of the vulcanized rubber was measured by using a rotating cylindrical drum device (DIN abrasion tester) around which a grinding cloth was wound.

(3) Peeling Force (Adhesive Force to Cord)

A plurality of cords were disposed in parallel on one side of the unvulcanized adhesion rubber layer sheet having a thickness of 4 mm so that the width was 25 mm, and canvas was laminated on the other side, and this laminated body (cord, adhesion rubber layer sheet, and canvas) was subjected to press-vulcanization (temperature 160° C., time 30 min, pressure 2.0 MPa) to prepare a strip sample (25 mm×150 mm×4 mm thickness) for a peeling test. In accordance with JIS K6256 (2013), the peeling test was performed at a tensile rate of 50 mm/min, and the peeling force (vulcanizing adhesive force) between the cord and the adhesion rubber layer sheet was measured under a room temperature atmosphere. For the adhesion rubber layer sheet of this peeling test, the formulation X (formulation not containing silica) in Table 1 was used. Furthermore, the peeling state was visually observed and evaluated according to the following criteria.

A: The rubber layer broke while the interface between the adhesion rubber layer and the cord was bonded.

B: Partial peeling occurred at the interface between the adhesion rubber layer and the cord.

C: Complete peeling occurred at the interface between the adhesion rubber layer and the cord.

[Durability Running Test of Belt]

As illustrated in FIG. 4, a durability running test was performed by using a biaxial running tester including a drive (Dr.) pulley 22 having a diameter of 50 mm and a driven (Dn.) Pulley 23 having a diameter of 125 mm The raw-edge cogged V-belt 21 was hung on each of the pulleys 22 and 23, a load of 10 N·m was applied to the driven pulley 23 at a rotation speed of 5,000 rpm of the drive pulley 22, and the belt 21 was run at an atmospheric temperature of 80° C. for a maximum of 24 hours. At this time, misalignment of 0.5° was set between the drive pulley and the driven pulley. The case where the belt 21 ran for 24 hours was judged that there was no problem in durability. In addition, the belt side surface (surface in contact with the pulley) after running was observed with a microscope, and the presence or absence of cord peeling was examined and evaluated according to the following criteria.

A: Peeling of the cord was not observed at all.

B: Peeling of the cord was observed to an extent that there was practically no problem.

C: The cord was peeled off to an extent that it could not be practically used.

In addition, a weight of the belt before running and a weight of the belt after running were measured with an electronic balance and the weight difference was calculated as the abrasion amount of the belt in durability running Furthermore, the pulley after running was visually observed and examined for the presence or absence of pulley abrasion. Finally, the comprehensive evaluation of the durability running test was judged according to the following criteria.

A: Neither abrasion of the pulley nor peeling of the cord was observed.

B: Abrasion of the pulley or peeling of the cord occurred, but there was practically no problem.

C: Either abrasion of the pulley or peeling of the cord occurred to an extent that it could not be practically used.

Examples 1 to 8 and Comparative Examples 1 to 4

(Formation of Rubber Layer)

Each of the rubber compositions of Table 1 (adhesion rubber layer) and Table 2 (compression rubber layer and tension rubber layer) was subjected to rubber kneading by using a known method such as a Banbury mixer and the kneaded rubber was passed through a calendar roll to prepare a rolled rubber sheet (adhesion rubber layer sheet, compression rubber layer sheet, and tension rubber layer sheet). In addition, for the rubber composition used for the adhesion rubber layer, the physical properties of the vulcanized rubber are shown in Table 1.

TABLE 1

(Adhesion rubber layer)

|  |  | X | Y | Z | S | T | U | V | W |
|---|---|---|---|---|---|---|---|---|---|
| Composition (parts) | Chloroprene rubber | | | | 100 | | | | |
|  | Carbon black | 60 | 50 | 40 | 30 | 60 | 70 | 50 | 20 |
|  | Silica | 0 | 10 | 20 | 10 | 10 | 10 | 2 | 10 |
|  | Naphthene oil | | | | 5 | | | | |
|  | Magnesium oxide | | | | 4 | | | | |
|  | Resorcin-formalin copolymer | | | | 1 | | | | |
|  | Antioxidant | | | | 4 | | | | |
|  | Zinc oxide | | | | 5 | | | | |
|  | Vulcanization accelerator TMTD | | | | 1 | | | | |
|  | N,N'-m-phenylene dimaleimide | | | | 2 | | | | |
|  | Stearic acid | | | | 2 | | | | |
|  | Hexamethoxymethylol melamine | | | | 3 | | | | |
| Physical properties of vulcanized rubber | Hardness (°) | 83 | 84 | 85 | 81 | 85 | 87 | 83 | 78 |
|  | Abrasion amount (mg) | 140 | 155 | 170 | 190 | 140 | 160 | 150 | 240 |

TABLE 2

(Compression rubber layer and tension rubber layer) Composition (parts)

| | |
|---|---|
| Chloroprene rubber | 100 |
| Aramid short fiber | 20 |
| Naphthene oil | 5 |
| Magnesium oxide | 4 |
| Carbon black | 30 |
| Antioxidant | 4 |
| Zinc oxide | 5 |
| N,N'-m-phenylene dimaleimide | 4 |
| Stearic acid | 2 |
| Vulcanization accelerator TMTD | 1 |
| Sulfur | 0.5 |

(Adhesion Treatment of Cord)

The cord was immersed in a first treatment agent (pretreatment liquid) shown in Table 3 and thereafter heat treatment was performed at 180° C. for 4 minutes. Next, the cord was immersed in a second treatment agent (RFL solution) shown in Table 4 and heat treatment was performed at 230° C. for 2 minutes. A third treatment (overcoat treatment) shown in Table 6 was performed by using third treatment agents containing the rubber composition A or B shown in Table 5. Through these treatments, cords in which each solid content contained in the first treatment agent, the second treatment agent and the third treatment agent was adhered as coating films (three layers of coating film) of the first anchor coat layer, the second anchor coat layer and the overcoat layer, respectively, were prepared. That is, in the cord after the adhesion treatment, the solid content contained in the third treatment agent is disposed as a coating film of the outermost layer (overcoat layer). The film thickness of the overcoat layer was from 10 to 20 μm.

In addition, in Table 5, for the cord to which the coating film was attached by these adhesion treatments, the measured value of the peeling force (vulcanizing adhesive force) and the state of peeling were also shown as a result of peeling test of the rubber composition for the adhesion rubber layer.

TABLE 3

(First treatment agent: pretreatment liquid)

| | Composition (parts) |
|---|---|
| Polymeric MDI | 10 |
| Toluene | 90 |
| Total | 100 |

TABLE 4

(Second treatment agent: RFL liquid)

| | Composition (parts) |
|---|---|
| VP latex (solid content 40%) | 250.0 |
| Resorcin | 37.4 |
| 37% Formalin | 20.7 |
| Sodium hydroxide | 0.1 |
| Water | 1142.0 |
| Total | 1450.2 |

TABLE 5

(Third treatment agent: rubber composition for overcoat layer)

| | | A | B | C | D | E |
|---|---|---|---|---|---|---|
| Composition (parts) | Chloroprene rubber | | | 100 | | |
|  | Carbon black | 0 | 40 | 0 | 0 | 0 |
|  | Silica | 40 | 0 | 10 | 50 | 60 |
|  | Naphthene oil | | | 10 | | |
|  | Magnesium oxide | | | 4 | | |
|  | Stearic acid | | | 1.5 | | |
|  | Resorcinol resin | | | 1 | | |
|  | Zinc oxide | | | 5 | | |
|  | Hexamethoxymethyl melamine | | | 3 | | |
| Vulcanized adhesive force with rubber composition for adhesion rubber layer | Peeling force (N/cm) | 160 | 50 | 60 | 140 | 130 |
|  | Peeling state | A | C | B | A | A |

TABLE 6

(Third treatment: treatment condition)

| Third treatment agent | Blending (parts) | Rubber composition | 100 |
| --- | --- | --- | --- |
| | | Polymeric MDI | 50 |
| | | Toluene | 2350 |
| | | Total | 2500 |
| | Solid content concentration | | 6.0% |
| Number of immersion | | | 3 |
| Drying and heat treatment condition | | | 165° C. × 4 minutes |

(Manufacturing of Frictional Power Transmission Belt)

A laminated body of the reinforcing fabric as a bottom fabric and the compression rubber layer sheet (unvulcanized rubber) was installed on a flat cogged mold having tooth portions and groove portions alternately disposed, with the reinforcing fabric facing downward, and press-volcanized at 75° C. to prepare a cog pad having a cog portion molded (which was not completely vulcanized, and was in a semi-vulcanized state). Next, both ends of the cog pad were cut perpendicularly from a top portion of a cog ridge portion.

A cylindrical mold was covered with an inner mother die in which tooth portions and groove portions were alternately disposed, the cog pad was wound thereon by being engaged with the tooth portions and the groove portions and jointed at the top portion of the cog ridge portion. On the wound cog pad was laminated an adhesion rubber layer sheet (lower adhesive rubber: unvulcanized rubber), thereafter, thereon was spun the cord into a spiral shape, and further thereon were sequentially wound an adhesion rubber layer sheet (upper adhesive rubber: the same as the adhesion rubber layer sheet above), the tension rubber layer sheet (unvulcanized rubber), and a reinforcing fabric as a top fabric, to prepare a molded body. Thereafter, the mold covered with a jacket was installed in a vulcanizing can, and vulcanization was conducted at a temperature of 160° C. for 20 minutes, to obtain a belt sleeve. The sleeve was cut into a V-shaped cross-sectional shape with a predetermined width in the longitudinal direction of the belt by using a cutter, and finished to a raw-edge cogged V-belt (size: upper width 22.0 mm, thickness 11.0 mm, and outer peripheral length 800 mm) which was a belt having the structure illustrated in FIG. 2, that is, a variable speed belt having cogs on the inner peripheral side of the belt.

Combinations of the rubber composition for the adhesion rubber layer and the rubber composition for the third treatment agent (overcoat layer) of the cord in the frictional power transmission belt (raw-edge cogged V-belt) obtained in Examples and Comparative Examples are shown in Table 7. The results of the durability running test of belt are also shown in Table 7.

TABLE 7

| | | Example | | | | | | | |
| --- | --- | --- | --- | --- | --- | --- | --- | --- | --- |
| | | 1 | 2 | 3 | 4 | 5 | 6 | 7 | 8 |
| Rubber composition (parts) | Adhesion rubber layer | Y | S | T | U | V | Y | Y | Y |
| | Carbon black | 50 | 30 | 60 | 70 | 50 | 50 | 50 | 50 |
| | Silica | 10 | 10 | 10 | 10 | 2 | 10 | 10 | 10 |
| | Overcoat layer | A | A | A | A | A | C | D | E |
| | Carbon black | 0 | 0 | 0 | 0 | 0 | 0 | 0 | 0 |
| | Silica | 40 | 40 | 40 | 40 | 40 | 10 | 50 | 60 |
| Durability running | Abrasion of pulley | Absence | Absence | Absence | Absence | Absence | Absence | Absence | Absence |
| | Peeling of cord | A | A | A | B | B | B | A | B |
| | Amount of Abrasion of belt (g) | 4.0 | 4.2 | 4.0 | 3.9 | 3.9 | 4.0 | 4.0 | 4.0 |
| | Comprehensive evaluation | A | A | A | B | B | B | A | B |

| | | Comparative Example | | | |
| --- | --- | --- | --- | --- | --- |
| | | 1 | 2 | 3 | 4 |
| Rubber composition (parts) | Adhesion rubber layer | Z | X | Y | W |
| | Carbon black | 40 | 60 | 50 | 20 |
| | Silica | 20 | 0 | 10 | 10 |
| | Overcoat layer | A | B | B | A |
| | Carbon black | 0 | 40 | 40 | 0 |
| | Silica | 40 | 0 | 0 | 40 |
| Durability running | Abrasion of pulley | Presence | Absence | Absence | Absence |
| | Peeling of cord | A | C | C | A |
| | Amount of Abrasion of belt (g) | 4.2 | 3.9 | 3.9 | 4.5 |
| | Comprehensive evaluation | C | C | C | C |

From the results of physical properties of the vulcanized rubber of the rubber composition for the adhesion rubber layer, shown in Table 1, it can be found that the abrasion amount of the vulcanized rubber increases with the silica content in the rubber composition Z containing 20 parts by mass of silica as compared with the rubber composition Y containing 10 parts by mass of silica. In addition, it can be found that the abrasion amount increases with decrease in the content of carbon black in the rubber compositions S and W in which carbon black was reduced to 30 to 20 parts by mass as compared with the rubber composition Y containing 50 parts by mass of carbon black.

From the peeling test results of the cord subjected to the adhesion treatment and the rubber composition X for the adhesion rubber layer not containing silica, shown in Table 5, in the case of the rubber composition A containing 40 parts by mass of silica as the rubber composition for the third treatment agent (overcoat layer), the adhesive force between the adhesion rubber layer and the cord was good and the rubber layer broke while the interface therebetween was bonded. On the other hand, in the rubber composition B not containing silica, complete peeling occurred at the interface between the adhesion rubber layer and the cord. In addition, in the rubber composition C in which silica was reduced to 10 parts by mass as compared with the rubber composition A, partial peeling occurs at the interface between the adhesion rubber layer and the cord.

From the results (Table 7) of the durability running test of the frictional power transmission belts manufactured by combining these rubber compositions for the adhesion rubber layer and the rubber compositions for the third treatment agent (overcoat layer), even the frictional power transmission belts (Examples 1 to 3) containing a relatively small amount of silica in the adhesion rubber layer, in the case of being combined with an overcoat layer (coating film) containing 40 parts by mass of silica, the adhesion between the cord and the adhesion rubber layer was good and peeling was not observed even after running for 24 hours. Furthermore, the amount of abrasion of the belt was small, and abrasion of the pulley was not observed. Particularly, Example 2 was a frictional power transmission belt in which the proportion of silica in the adhesion rubber layer was as large as 33 parts by mass based on 100 parts by mass of carbon black, no peeling was observed in the 24 hours running, whereas the abrasion amount of the belt was somewhat large.

Example 4 was a frictional power transmission belt in which the amount of carbon black in the adhesion rubber layer was as large as 70 parts by mass, and slight peeling of the cord was observed on the side of the belt after running for 24 hours, which causes no practical problem. Example 5 was a frictional power transmission belt in which the proportion of silica in the adhesion rubber layer was as small as 4 parts by mass based on 100 parts by mass of carbon black, and slight peeling of the cord was observed on the side of the belt after running for 24 hours, which causes no practical problem.

Example 6 was a frictional power transmission belt containing 10 parts by mass of silica in the overcoat layer, and slight peeling of the cord was observed on the side of the belt after running for 24 hours, which causes no practical problem. Example 8 was a frictional power transmission belt containing 60 parts by mass of silica in the overcoat layer, and slight peeling of the cord was observed on the side of the belt after running for 24 hours, which causes no practical problem. Taking into consideration of the results of Examples 6 to 8, either case of the blending amount of silica in the overcoat layer was too small or too large, the peeling of the cord was caused.

Comparative Example 1 was a frictional power transmission belt containing 20 parts by mass of silica in the adhesion rubber layer, and the amount of abrasion of the belt during 24 hours running was large, and abrasion of the pulley was also observed. Comparative Example 2 was a frictional power transmission belt not containing silica in any of the adhesion rubber layer and the overcoat layer (coating film), and the cord was peeled off at the side of the belt after running for 24 hours (degree of causing practical problem). Comparative Example 3 was a frictional power transmission belt containing 10 parts by mass of silica in the adhesion rubber layer and not containing silica in the overcoat layer (coating film), and the cord peeled off at the side of the belt after running for 24 hours (degree of causing practical problem). Comparative Example 4 was a frictional power transmission belt in which the amount of carbon black in the adhesion rubber layer was as small as 20 parts by mass, and the amount of abrasion of the belt during 24 hours running was large.

Although the present invention has been described in detail and with reference to specific embodiments, it will be apparent to those skilled in the art that various modifications and changes can be made without departing from the spirit and scope of the present invention.

This application is based on Japanese Patent Application No. 2016-082465 filed on Apr. 15, 2016 and Japanese Patent Application No. 2017-078980 filed on Apr. 12, 2017, the contents of which are incorporated herein by reference.

INDUSTRIAL APPLICABILITY

The frictional power transmission belt of the present invention can be applied to, for example, a V-belt (wrapped V-belt, raw-edge V-belt, and raw-edge cogged V-belt), a V-ribbed belt, a flat belt, and the like. Specifically, it is preferably applied to a V-belt (variable speed belt) used in a transmission (continuously variable transmission) in which the gear ratio varies steplessly while the belt is running, for example, a raw-edge cogged V-belt and a raw-edge double cogged V-belt, which are used for a continuously variable transmission of a motorcycle, an ATV (4 wheel buggy), a snowmobile, and the like.

REFERENCE SIGNS LIST

1 Frictional power transmission belt
2, 6 Reinforcing fabric
3 Tension rubber layer
4 Adhesion rubber layer
4a Tension member
5 Compression rubber layer

The invention claimed is:

1. A frictional power transmission belt comprising:
a tension member extending in a longitudinal direction of the frictional power transmission belt;
an adhesion rubber layer in contact with at least a portion of the tension member;
a compression rubber layer; and
a tension rubber layer,
wherein the adhesion rubber layer is formed of a first vulcanized rubber composition comprising a rubber component and a filler, the rubber component of the first vulcanized rubber composition being a chloroprene rubber,
wherein the filler of the first vulcanized rubber composition contains from 30 to 60 parts by mass of carbon black based on 100 parts by mass of the rubber component and contains from 0.1 to 15 parts by mass of silica based on 100 parts by mass of the rubber component,
wherein the tension member has, on a surface thereof, an overcoat layer formed of a second vulcanized rubber composition comprising a rubber component and silica, the rubber component of the second vulcanized rubber composition being a chloroprene rubber,
wherein the frictional power transmission belt is a raw-edge cogged V-belt,
wherein the first vulcanized rubber composition has a proportion of the silica being from 10 to 30 parts by mass based on 100 parts by mass of the carbon black in the filler of the first vulcanized rubber composition, and
wherein the second vulcanized rubber composition has a proportion of silica being from 15 to 50 parts by mass based on 100 parts by mass of the rubber component.

2. The frictional power transmission belt according to claim 1, wherein the overcoat layer has an average thickness of from 5 to 30 µm.

3. The frictional power transmission belt according to claim 1, wherein the tension member comprises a twisted cord comprising a polyester fiber and/or a polyamide fiber.

* * * * *